United States Patent
Bowen

(10) Patent No.: US 6,481,960 B2
(45) Date of Patent: Nov. 19, 2002

(54) VARIABLE GAS TURBINE COMPRESSOR VANE STRUCTURE WITH SINTERED-AND-INFILTRATED BUSHING AND WASHER BEARINGS

(75) Inventor: Wayne Ray Bowen, West Chester, OH (US)

(73) Assignee: General Electric Co., Schenectady, NY (US)

( * ) Notice: Subject to any disclaimer, the term of this patent is extended or adjusted under 35 U.S.C. 154(b) by 0 days.

(21) Appl. No.: 09/821,993

(22) Filed: Mar. 30, 2001

(65) Prior Publication Data

US 2002/0154991 A1 Oct. 24, 2002

(51) Int. Cl.[7] ............................................... F01D 17/16
(52) U.S. Cl. ...................... 415/160; 415/191; 415/200; 415/229
(58) Field of Search ................................ 415/160, 162, 415/200, 191, 229

(56) References Cited

U.S. PATENT DOCUMENTS

| | | | |
|---|---|---|---|
| 4,732,818 A | * 3/1988 | Pratt et al. | ..................... 419/10 |
| 4,767,656 A | 8/1988 | Chee et al. | ................. 428/116 |
| 4,834,613 A | * 5/1989 | Hansen et al. | ............... 415/160 |
| 5,162,157 A | * 11/1992 | Tanaka et al. | ................ 419/10 |
| 5,364,682 A | 11/1994 | Tanaka et al. | ............... 428/138 |
| 6,264,369 B1 | 7/2001 | Mesing et al. | ............. 384/300 |

* cited by examiner

Primary Examiner—Edward K. Look
Assistant Examiner—Kimya N McCoy

(57) ABSTRACT

A variable gas turbine compressor vane structure includes a gas turbine compressor vane having a vane support at an end thereof, and a case structure having a bearing support disposed to engage the vane support of the gas turbine compressor vane. The bearing support is typically a bearing bushing or a bearing washer. The bearing support is made of a metal skeleton having open-cell porosity extending therethrough, and an infiltrant material such as an organic or a ceramic infiltrated into the porosity of the metal skeleton.

20 Claims, 4 Drawing Sheets

VARIABLE GAS TURBINE COMPRESSOR VANE STRUCTURE WITH SINTERED-AND-INFILTRATED BUSHING AND WASHER BEARINGS

This invention relates to gas turbine engines and, more particularly, to the support structure for variable compressor vanes in such engines.

BACKGROUND OF THE INVENTION

In an aircraft gas turbine (jet) engine, air is drawn into the front of the engine, compressed by a shaft_mounted compressor, and mixed with fuel. The mixture is burned, and the hot exhaust gases are passed through a turbine mounted on the same shaft. The flow of combustion gas turns the turbine, which turns the shaft and provides power to the compressor and fan blades. The hot exhaust gases flow from the back of the engine, driving it and the aircraft forwardly.

The compressor at the front of the engine typically has a low-pressure section and a high-pressure section. In the highpressure section, the air is compressed by the combined action of radially extending compressor blades that rotate with the compressor shaft about the centerline of the engine, and radially extending compressor vanes that are not mounted on the compressor shaft and do not rotate about the centerline of the engine.

However, the compresor vanes may be mounted so that they may be controllably rotated about their own radially extending longitudinal axes to vaiy the angle of the compressor vane airfoil to the air flow. The control of the variable vanes aids in establishing the air pressure ratio and flow rate that is introduced into the combustor, responsive to the operating requirements of the engine and the altitude.

Each of the high-pressure compressor vanes includes an airfoil with a shaft support extending from each end of the airfoil. The shaft supports are rotatably mounted to the inner shroud and the outer case that define the air flow path. A bearing structure in the shroud and case, including bushing bearings and washer bearings, supports the vane and allows it to rotate. In current engines, the bearings must function at a temperature of about 700° F. or above for extended periods of time. Existing bearings are typically made of a polyimide material reinforced with woven carbon fibers. These bearings are operable and are widely used. However, they are susceptible to erosion and oxidation damage. Further, it is expected that the existing bearings will not be operable with projected increases in compressor pressure ratio and service temperatures in future engines.

There is a need for improved variable gas turbine compressor vane structures. The present invention fulfills this need, and further provides related advantages.

BRIEF SUMMARY OF THE INVENTION

The present invention provides a variable gas turbine compressor vane structure that is operable at compressor pressure ratios and service temperatures in excess of those experienced in existing engines. Additionally, the variable gas turbine compressor vane structure is more resistant to erosion and oxidation damage than are available structures. The approach of the present invention requires no change to the airfoil section of the compressor vanes or to their mode of operation.

A variable gas turbine compressor vane structure comprises a gas turbine compressor vane having a vane support at an end thereof, and a case structure comprising a bearing support disposed to engage the vane support of the gas turbine compressor vane. The bearing support comprises a metal skeleton having open-cell porosity extending therethrough, and an infiltrant material infiltrated into the porosity of the metal skeleton. Examples of bearing supports include an outer-case bearing bushing, an outer-case bearing washer, and an inner-shroud bearing bushing.

The metal skeleton has adequate porosity to allow the infiltrant material to penetrate the metal skeleton. The metal skeleton may be, for example, a sintered nickel-base alloy or superalloy. The metal skeleton provides structural strength for the bearing support. The infiltrant material may be, for example, an organic polymer such as a polyimide, a ceramic, or a metal with melting point less than that of the metal skeleton.

The present approach provides a porous metal bearing support skeleton, which is infiltrated with another material. In the case of the preferred polymer infiltrant, the polymer material provides a surface lubricant that is continually replenished with new polymer as the metal skeleton wears.

The bearing support is resistant to erosion and oxidation damage and is operable to higher temperatures than possible with conventional reinforced polymer bearing supports. Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

DETAILED DESCRIPTION OF THE INVENTION

Figure 1:
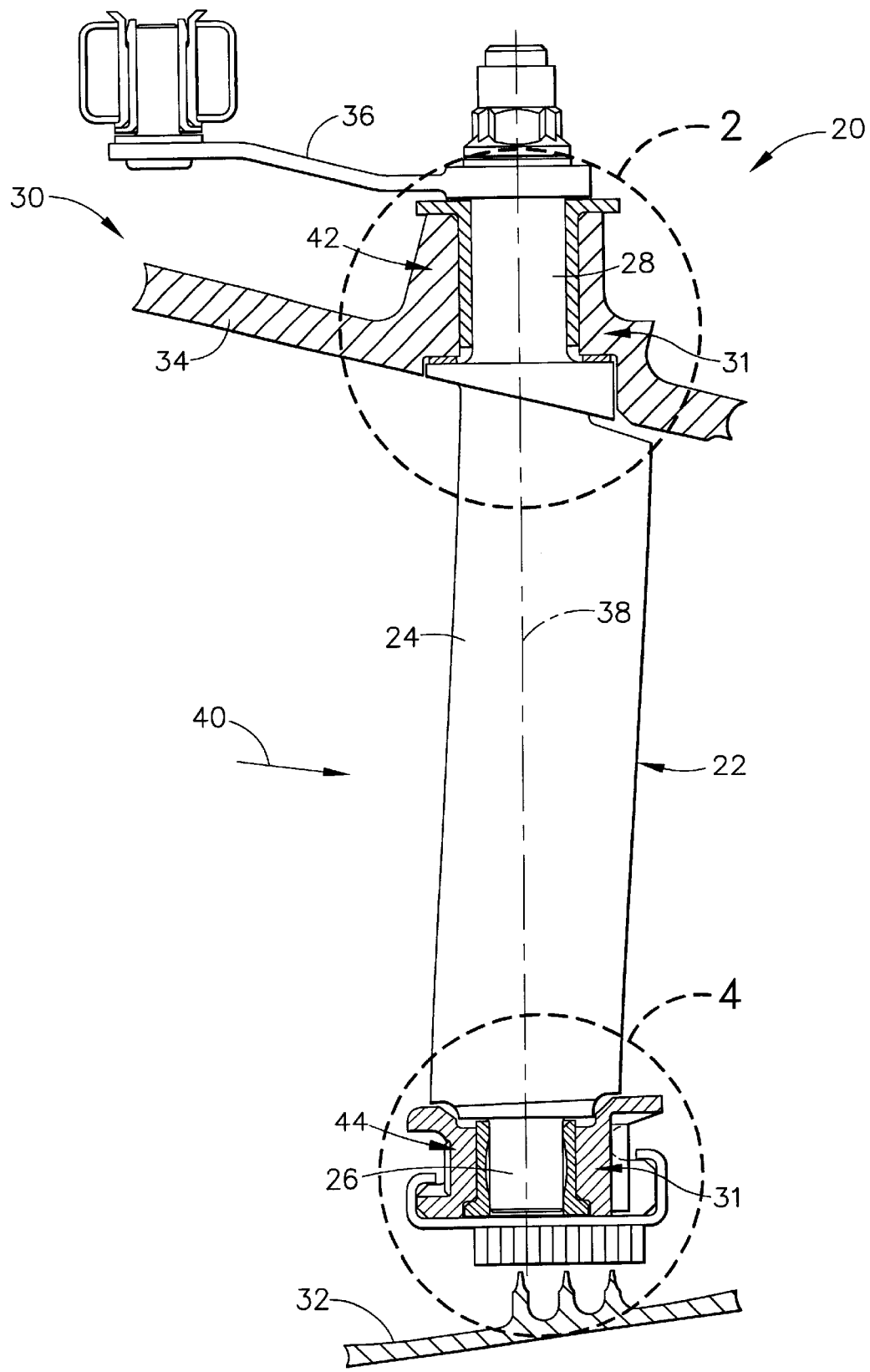
FIG. 1 is a schematic elevational view of a variable gas turbine compressor vane structure.

FIG. 1 illustrates a variable gas turbine compressor vane structure 20. The compressor vane structure 20 includes a gas turbine compressor vane 22 having an airfoil 24, a cylindrical inner vane support 26 at an inner end thereof, and a cylindrical outer vane support 28 at an outer end thereof. A case structure 30 includes an inner shroud 32 and an outer case 34 that together define an annular path for a flow of air 40 in the compressor stage. An actuator arm 36 is attached to the outer vane support 28 to controllably rotate the compressor vane 22, and thence its airfoil 24, about its longitudinal axis 38 and relative to the flow of air 40 in the annular flow path between the inner shroud 32 and the outer case 34.

The vane structure 20 is supported on the case structure 30 by bearing supports 31, several types of which are illustrated. The outer vane support 28 of the compressor vane 22 is supported on the outer case 34 by an outer-case bearing support 42, two embodiments of which are illustrated in greater detail in FIGS. 2–3. The inner vane support 26 of the compressor vane 22 is supported on the inner shroud 32 by an inner-shroud bearing support 44, illustrated in greater detail in FIG. 4.

Figure 2:
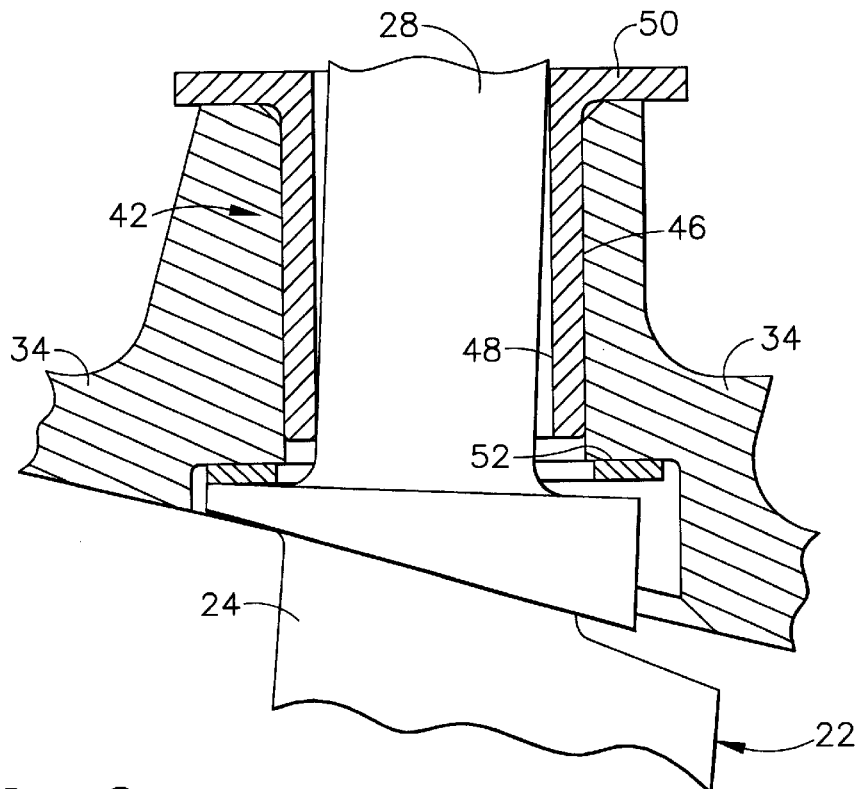
FIG. 2 is an enlarged detail of FIG. 1 taken in region

The outer-case bearing support 42 of FIG. 2 includes an outer-case bearing bushing 46 supported on the outer case 34 and having an inner bore 48 into which the cylindrical outer vane support 28 is rotatably received. In this embodiment, the outer-case bearing bushing 46 has an outer flange 50. The airfoil 24 rides against an outer-case bearing washer 52 as the airfoil 24 rotates.

Figure 3:
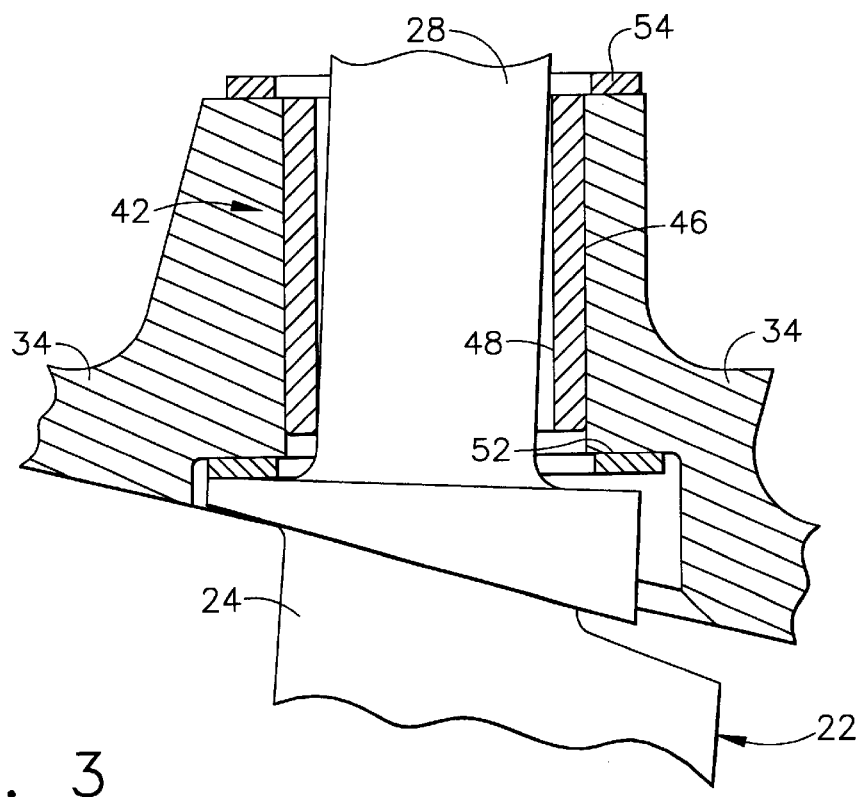
FIG. 3 is an alternative embodiment of the outer-case bearing support of FIG. 2.

The embodiment of the outer-case bearing support 42 of FIG. 3 is similar to that of FIG. 2 and the above description is incorporated, except that the outer-case bearing bushing 46 has no outer flange, and instead there is an outer washer 54.

Figure 4:
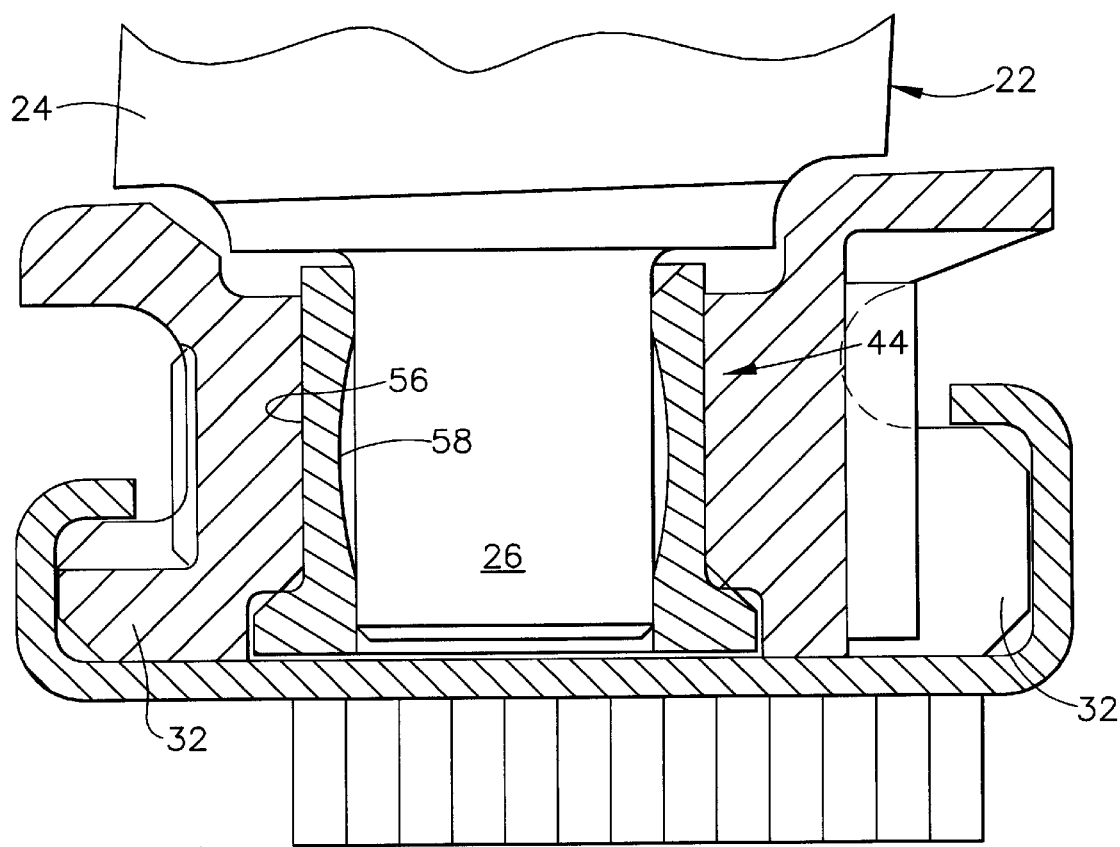
FIG. 4 is an enlarged detail of FIG. 1 taken in region 4.

The inner-shroud bearing support 44 of FIG. 4 includes an inner-shroud bearing bushing 56 supported on the inner shroud 32 and having an inner bore 58 into which the cylindrical inner vane support 26 is rotatably received.

Figure 5:
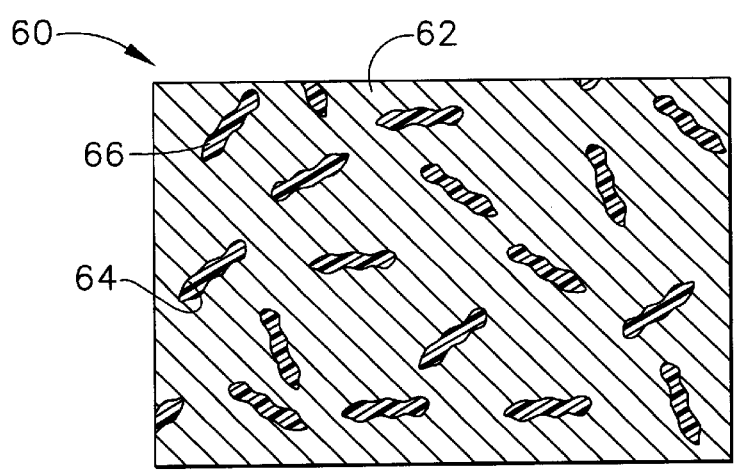
FIG. 5 is an idealized microstructure of the bearing support.

The outer-case bearing bushing 46, the outer-case bearing washer 52, and/or the inner-shroud bearing bushing 56 are made of an infiltrated porous metallic structure 60, illustrated in FIG. 5. The outer washer 54, where present, may be made of the same material.

The infiltrated porous metallic structure 60 includes a metal skeleton 62 initially having open-cell porosity 64 extending therethrough, but which is infiltrated with another material during processing. The metal skeleton 62 is porous to accept the infiltrant. The metal skeleton 62 preferably occupies from about 20 to about 60 percent by volume of the metallic structure 60, and the porosity 64 occupies the remainder of the volume of the metallic structure 60, or from about 80 to about 40 percent by volume, prior to infiltration. The porosity is "open-cell", meaning that it forms a continuous path through the metallic structure and can be infiltrated from the surfaces of the metallic structure. (The continuous path is not apparent in a sectional view such as FIG. 5, but it is present.)

The metal skeleton 62 is preferably made of nickel-base alloy, which may be a nickel-base superalloy. (A nickel-base alloy has more nickel than any other element, and a nickel-base superalloy additionally is strengthened by the gamma-prime precipitation mechanism.) A preferred nickel-base superalloy is Hastelloy X, having a nominal composition in weight percent of about 22 percent chromium, 18 percent iron, 9 percent molybdenum, balance nickel. The metal skeleton 62 is preferably made by sintering metal powders, as will be discussed subsequently.

An infiltrant material 66 is infiltrated into what was initially the porosity 64 of the metal skeleton 62. The infiltrant material provides a low coefficient of friction for the infiltrated porous metallic structure 60 and is preferably an organic material such as a polyimide. The infiltrant material may instead be a ceramic. The infiltrant material may instead be a metal having a melting point lower than that of the metal skeleton 62. An example of such a metallic infiltrant is a braze alloy such as nickel braze.

Figure 6:
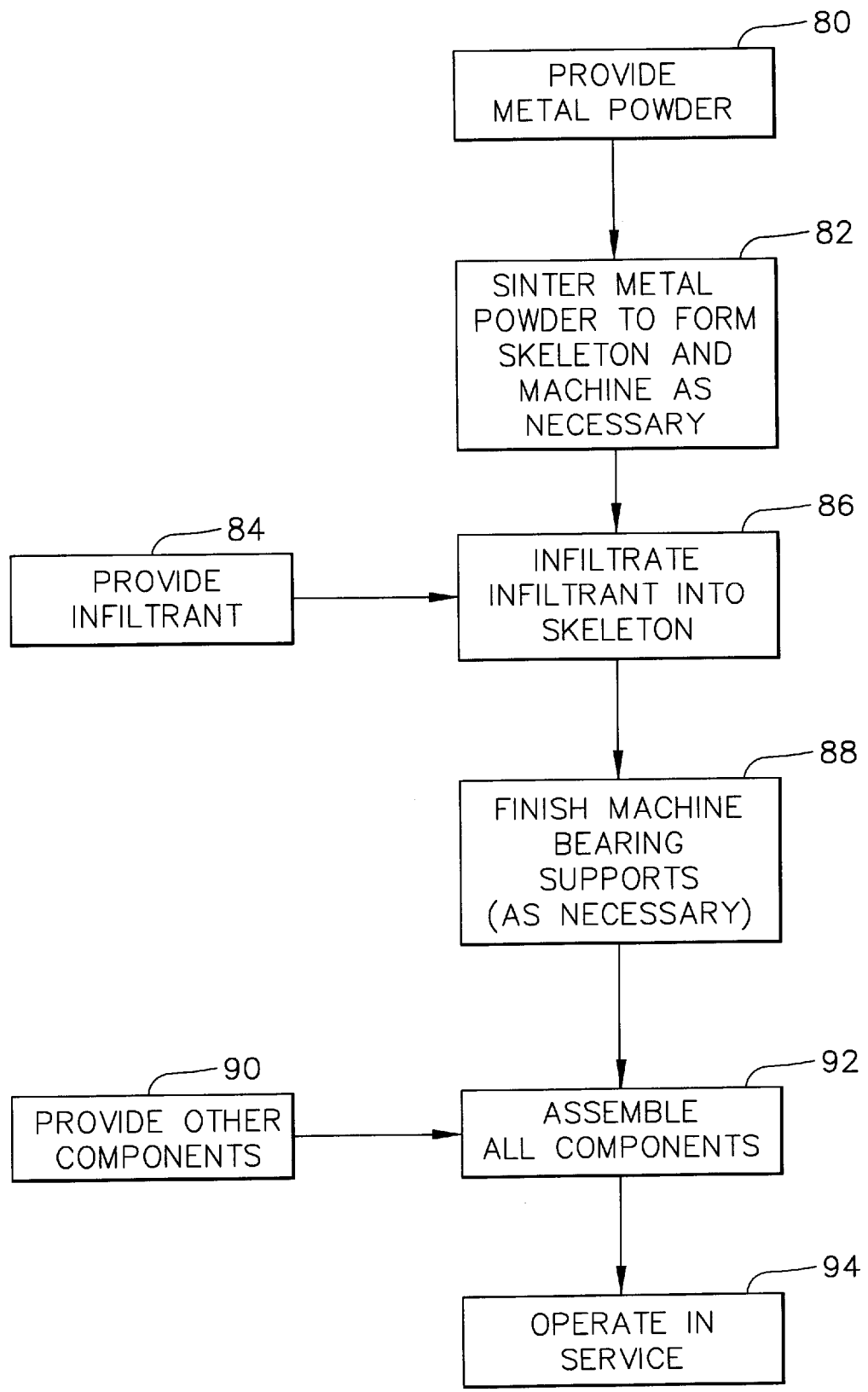
FIG. 6 is a block flow diagram of an approach for practicing the invention.

FIG. 6 depicts a preferred approach for practicing the invention. The bearing supports are made by providing a metal powder of the material used in the metal skeleton 62, such as Hastelloy X powder, numeral 80. The powder is sintered, numeral the metal skeleton 62. In sintering, the powder is compacted together and then heated to a sintering temperature at which the individual powder particles bond together and sinter. In the present case, the sintering process is halted at a point that the porosity 64 remains within the desired volume-percentage range. Optionally, the sintered structure is machined as necessary to the desired bearing shape prior to the next step.

The infiltrant material is provided, numeral 84. The infiltrant material is infiltrated into the open-cell porosity 64 of the metal skeleton 62, numeral 86. This infiltration 86 is typically accomplished by heating the metal skeleton 62 and the infiltrant material to a temperature at which the infiltrant material is flowable, and then forcing it into the porosity 64 under pressure, by vacuum, or by gravity flow.

The sintering step 82 and the infiltrating step 86 produce a final article that is typically close to the required dimensions, but may not be dimensioned exactly as required for the bearing support application. In that case, the sintered-and-infiltrated article is finish machined as necessary, numeral 88. The remaining components are provided, numeral 90, and all of the components are assembled together, numeral 92, in the manner illustrated in FIG. 1. The final variable gas turbine compressor vane structure 20 is thereafter placed into service and operated, numeral 94.

In service, the compressor vane structure is heated to a service temperature that is on the order of 700° F. in current gas turbine engines, and is likely to be greater in future engines. At that temperature, the preferred organic infiltrant exposed at the surface of the infiltrated porous metallic structure 60 serves as a lubricant for the wearing motion of the contacting portion of the compressor vane 22 as it is rotated by the actuator arm 36. The metal skeleton 62 retains its shape that defines the shape of the bearing support. As the organic infiltrant is lost during service, additional infiltrant is available at the surface to continue the lubrication role.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A variable gas turbine compressor vane structure, comprising:
   a gas turbine compressor vane having a vane support at an end thereof; and
   a case structure comprising a bearing support disposed to engage the vane support of the gas turbine compressor vane, the bearing support comprising
   a metal skeleton having open-cell porosity extending therethrough, and
   an infiltrant material infiltrated into the porosity of the metal skeleton.

2. The compressor vane structure of claim 1, wherein the bearing support comprises an outer-case bearing bushing.

3. The compressor vane structure of claim 1, wherein the bearing support comprises an outer-case bearing washer.

4. The compressor vane structure of claim 1, wherein the bearing support comprises an inner-shroud bearing bushing.

5. The compressor vane structure of claim 1, wherein the metal skeleton comprises a nickel-base alloy.

6. The compressor vane structure of claim 1, wherein the metal skeleton includes from about 20 to about 80 percent by volume of porosity.

7. The compressor vane structure of claim 1, wherein the infiltrant material is an organic material.

8. The compressor vane structure of claim 7, wherein the organic material is a polyimide.

9. The compressor vane structure of claim 1, wherein the infiltrant material is a ceramic.

10. The compressor vane structure of claim 1, wherein the infiltrant material is a metal alloy having a melting point less than that of the metal skeleton.

11. The compressor vane structure of claim 1, further including
an actuator arm attached to the vane support.

12. A variable gas turbine compressor vane structure, comprising:
a gas turbine compressor vane having
an outer vane support at an outer end thereof, and
an inner vane support at an inner end thereof, and
a case structure comprising a bearing support disposed to engage one of the vane supports of the gas turbine compressor vane, the bearing support comprising
a nickel-base alloy skeleton having open-cell porosity extending therethrough, and
an infiltrant material infiltrated into the porosity of the metal skeleton, the infiltrant material being selected from the group consisting of a ceramic and an organic.

13. The compressor vane structure of claim 12, wherein the bearing support comprises an outer-case bearing bushing.

14. The compressor vane structure of claim 12, wherein the bearing support comprises an outer-case bearing washer.

15. The compressor vane structure of claim 12, wherein the bearing support comprises an inner-shroud bearing bushing.

16. The compressor vane structure of claim 12, wherein the metal skeleton includes from about 20 to about 80 percent by volume of porosity.

17. The compressor vane structure of claim 12, wherein the infiltrant material is an organic material.

18. The compressor vane structure of claim 12, wherein the infiltrant material is an organic polyimide.

19. The compressor vane structure of claim 12, wherein the infiltrant material is a ceramic.

20. The compressor vane structure of claim 12, wherein the infiltrant material is a metal alloy having a melting point less than that of the metal skeleton.

* * * * *